ated at one point by a spring; Fig. 2 is a
UNITED STATES PATENT OFFICE.

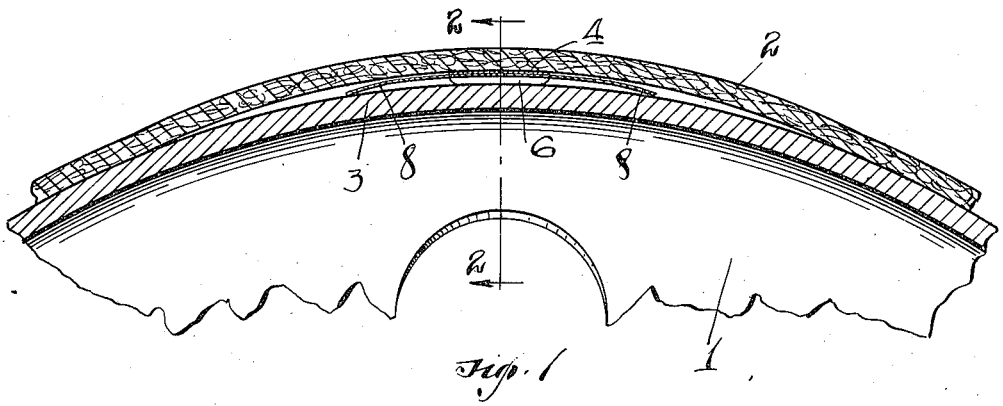
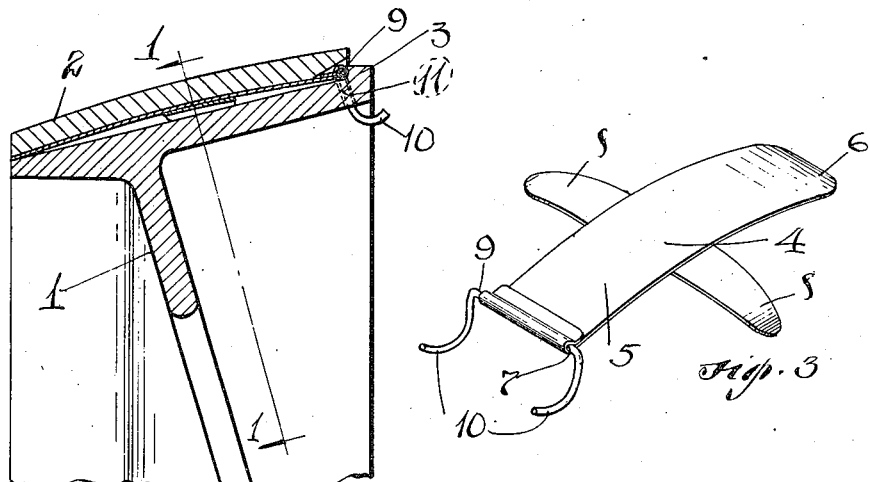
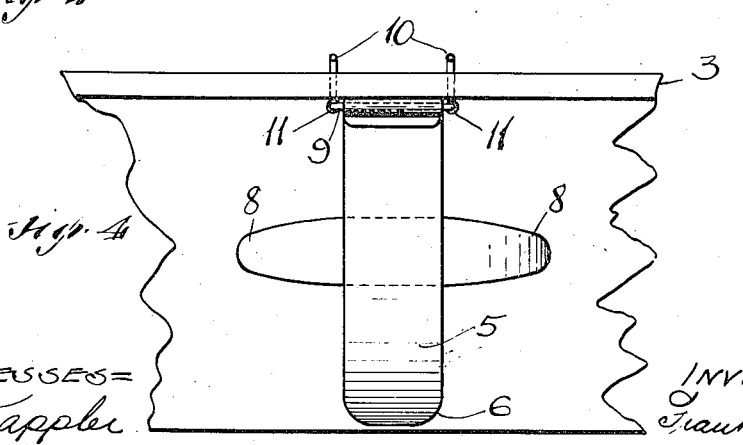

FRANK J. HEMM, OF PIQUA, OHIO.

CLUTCH.

1,204,438.  Specification of Letters Patent.  Patented Nov. 14, 1916.

Application filed June 30, 1915. Serial No. 37,132.

*To all whom it may concern:*

Be it known that I, FRANK J. HEMM, a citizen of the United States, and a resident of Piqua, county of Miami, and State of Ohio, have invented a new and useful Improvement in Clutches, of which the following is a specification, the principle of the invention being herein explained and the best mode in which I have contemplated applying that principle, so as to distinguish it from other inventions.

The subject of the present invention is an improvement in clutches of the cone or band type. In this form of clutch the male member is usually provided with a friction facing of leather or other fabric which engages with the female member of the cone. This facing, through lack of attention, often becomes hard, causing a grabbing action upon engagement and making the clutch hard to disengage. In my improved clutch means are provided whereby the leather facing is raised above the male member at one or more points by springs, so that the clutch engages smoothly and without grabbing at all times.

Another object is to provide springs which can be maintained in position and yet be readily removable without the necessity of removing the facing.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing: Figure 1 is a section on the line 1—1, Fig. 2, through a portion of a cone clutch showing the facing raised at one point by a spring; Fig. 2 is a transverse section taken on the line 2—2 Fig. 1; Fig. 3 is a view in perspective of one of the springs; and Fig. 4 is a plan view of a portion of the clutch with the facing removed, showing the spring in position.

In Fig. 1 I show a portion of the male member 1 of a cone clutch provided with a facing 2 preferably of leather, the periphery of the clutch being provided at the rear edge with a raised flange 3 which assists in maintaining the facing in position.

To raise the facing 3 at points about the periphery of the clutch I employ flat curved springs 4 which are adapted to be inserted between the clutch and the facing. These springs are made with an arched arm 5 having one end 6 tapered and formed with the corners rounded to prevent the spring from cutting into the metal face of the clutch when the spring is compressed. At the other end this spring is bent double upon itself to provide an aperture 7 transversely of the same. The spring 4 also has two oppositely directed arched spring-arms 8 which also have rounded tapered ends. These arms give added strength to the spring and help to keep the facing raised over a considerable area. The two springs 4 and 8 are preferably formed as a single integral member, although if desired they may be constructed separately and attached together by welding or soldering.

In the transverse aperture 7 at the rear end of the spring a pin 9 preferably of wire is pivotally mounted. This pin is provided with two downwardly extending curved portions 10 which are adapted to be received in holes 11 drilled through the face of the male member 1 adjacent the flange 3. This pin 9 with the two extending portions 10 is adapted to act as a hinge to hold the spring in position but as will readily be seen the spring can be inserted between the member and the facing without the necessity for removing the latter.

As illustrated in the drawings only a single spring is shown but it is to be understood that two or more will be used around the periphery of the clutch so that there will be corresponding raised portions which will engage with the female member first, when the clutch is allowed to take hold, giving the smooth action desired. The tapered rounded ends of the spring and the arms allow these portions to slide along the face of the male member as the clutch is engaged, thus preventing the spring from breaking or cutting the face of the member.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a clutch, the combination with a male member and a facing therefor, of a flat curved spring adapted to be mounted on said member below said facing, said spring having four spaced arms adapted to contact said member and support said spring.

2. In a clutch, the combination with a male members and a facing therefor of a flat curved spring adapted to be mounted on said member below said facing and transversely of the same, a hinge on one end of said spring, adapted to be removably attached to said member to position said spring thereon.

3. In a clutch, the combination with a male member having an aperture extending through the face thereof, and a facing for said member, of a flat curved spring adapted to be mounted on said member transversely of and below said facing and adapted to raise the same, a wire pivotally attached to one end of said spring and having a curved arm adapted to be received in such aperture in said member and maintain said spring in its transverse position.

4. In a clutch the combination with a male member having an aperture through the face thereof adjacent the rear edge, a flat curved spring mounted on said member transversely of and below said facing and adapted to raise the same, and a wire pivotally attached to said spring and provided with two curved downwardly extending portions adapted to be received in such apertures in said spring to maintain the same in its transverse position.

5. In a clutch the combination with a male member and a facing therefor, of a flat curved spring having oppositely extending curved arms, said spring being pivotally attached to said member, said spring being positioned transversely of and below said facing.

6. In a clutch the combination with a male member and a facing therefor, of a flat curved spring, having oppositely directed curved arms mounted on said member under said facing and a hinge on said spring adapted to removably attach said spring to said member and to maintain said spring transversely of said facing.

7. In a clutch, the combination with a male member having an aperture through the face thereof adjacent one side, and a facing for said member, of a flat curved spring having oppositely extending arms, said spring being removably mounted on said member below said facing and transversely of the same, a wire pivotally attached to one end of said spring and having a curved downwardly extending portion adapted to be received in such aperture to maintain said spring in its transverse position.

8. In a clutch the combination with a male member having apertures through the face thereof, adjacent one side, and a facing for said member, of a flat curved spring having oppositely extending curved arms, said spring being removably mounted on said member below said facing and transversely of the same, a wire pivotally attached to one end of said spring and having downwardly extending curved portions, adapted to be received in such apertures in the face of said member, thereby maintaining said spring in its transverse position.

9. In a clutch the combination with a male member and a facing therefor, of a spring adapted to be mounted on said member beneath said facing, said spring comprising two flat arched springs integrally connected at their central portions and disposed at right angles to each other.

Signed by me, this 24 day of June, 1915.

FRANK J. HEMM.

Attested by—
 GILBERT F. FRYLING,
 JOHN A. HEMM.